(12) United States Patent
Teboulle et al.

(10) Patent No.: US 10,804,967 B2
(45) Date of Patent: Oct. 13, 2020

(54) ELECTRICITY METER COMPRISING A POWERLINE COMMUNICATION INTERFACE AND AT LEAST ONE RADIO-FREQUENCY INTERFACE

(71) Applicant: SAGEMCOM ENERGY & TELECOM SAS, Rueil Malmaison (FR)

(72) Inventors: Henri Teboulle, Rueil Malmaison (FR); Kaveh Razazian, Rueil Malmaison (FR); Ziv Roter, Rueil Malmaison (FR); Thierry Vernet, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 0 days.

(21) Appl. No.: 16/464,110

(22) PCT Filed: Nov. 28, 2017

(86) PCT No.: PCT/EP2017/080693
§ 371 (c)(1),
(2) Date: May 24, 2019

(87) PCT Pub. No.: WO2018/099917
PCT Pub. Date: Jun. 7, 2018

(65) Prior Publication Data
US 2019/0296797 A1  Sep. 26, 2019

(30) Foreign Application Priority Data

Nov. 30, 2016 (FR) .................................. 16 61694

(51) Int. Cl.
*H04B 3/00* (2006.01)
*H04B 3/54* (2006.01)
(Continued)

(52) U.S. Cl.
CPC ............... *H04B 3/542* (2013.01); *H04Q 9/00* (2013.01); *H04Q 9/02* (2013.01); *H04Q 9/14* (2013.01);
(Continued)

(58) Field of Classification Search
CPC . H04B 3/542; H04Q 9/00; H04Q 9/02; H04Q 9/14; H04Q 2209/25;
(Continued)

(56) References Cited

U.S. PATENT DOCUMENTS

| 7,345,998 B2 * | 3/2008 | Cregg | H04J 13/00 370/230 |
| 2012/0036250 A1 * | 2/2012 | Vaswani | G01D 4/004 709/224 |

(Continued)

FOREIGN PATENT DOCUMENTS

| GB | 2529736 A | 3/2016 |
| WO | 2010/122163 A1 | 10/2010 |
| WO | 2012/075496 A2 | 6/2012 |

OTHER PUBLICATIONS

Mar. 27, 2018 International Search Report issued in International Patent Application No. PCT/EP2017/080693.

*Primary Examiner* — Tesfaldet Bocure
(74) *Attorney, Agent, or Firm* — Oliff PLC; R. Brian Drozd

(57) ABSTRACT

A system that includes a powerline communication network with a reactive routing protocol and at least one gateway comprising a powerline communication interface and one radio-frequency communication interface. A smart electricity meter also includes a powerline communication interface and at least one radio-frequency communication interface: broadcasts an announcement request message on each of its communication interfaces; after reception of one or more announcement messages, selects a relay agent having the (Continued)

lowest route cost for joining a centralised management device; and making a registration request, using the selected relay agent as a proxy. After registration, the routing of messages coming from or going to said smart electricity meter takes place at the data link layer of the OSI model.

16 Claims, 7 Drawing Sheets

(51) Int. Cl.
    *H04Q 9/02*          (2006.01)
    *H04Q 9/14*          (2006.01)
    *H04Q 9/00*          (2006.01)

(52) U.S. Cl.
    CPC ..... *H04Q 2209/25* (2013.01); *H04Q 2209/30* (2013.01); *H04Q 2209/40* (2013.01); *H04Q 2209/43* (2013.01); *H04Q 2209/60* (2013.01)

(58) Field of Classification Search
    CPC ........... H04Q 2209/30; H04Q 2209/40; H04Q 2209/43; H04Q 2209/60
    USPC .................................................. 375/257, 377
    See application file for complete search history.

(56) References Cited

U.S. PATENT DOCUMENTS

| | | | |
|---|---|---|---|
| 2014/0036702 A1* | 2/2014 | Van Wyk | H04B 3/46 370/252 |
| 2015/0271062 A1* | 9/2015 | Vijayasankar | H04L 45/26 370/252 |

* cited by examiner

ELECTRICITY METER COMPRISING A POWERLINE COMMUNICATION INTERFACE AND AT LEAST ONE RADIO-FREQUENCY INTERFACE

The present invention relates to a connection of a smart electricity meter, comprising a powerline communication interface and at least one radio-frequency communication interface, to a system comprising a powerline communication network with a reactive routing protocol.

Powerline communication networks for systems of the AMM (automated meter management) type have appeared during the past few years. Mention can be made for example of the G3-PLC standard specified in the ITU-T recommendation G.9903. In such powerline communication networks, communications are established between electricity meters, known as smart electricity meters, and a central device, sometimes referred to as a base node or coordinator, to allow in particular automated remote reading of electricity consumption measurements made by said smart electricity meters. A plurality of base nodes are then geographically deployed in order to distribute the load in collecting metering readings from the smart electricity meters. Each base node then serves as a relay between the smart electricity meters and an entity managing the AMM system.

Such powerline communications shall deal with interferences related to crosstalk phenomena, and/or to a lack of reliability of some communication links in the powerline communication network (e.g. range limit due to wires length), and/or to noises of various natures (white noise, coloured noise, pulsed noise mainly), and/or to impedance mismatching. For the record, crosstalk is a phenomenon that enables signals, typically by capacitive coupling, to propagate without passing through copper pairs proper, but through invisible stray connections. This phenomenon is unstable since it may vary according to temperature or activity on the powerline communication network. It should be noted that there may also be crosstalk within any one apparatus via copper connections on printed circuits and/or via certain components that constitute said apparatus. These phenomena may cause breaks in communication links and cause disconnections of nodes in the communication network. Such instability of powerline communication networks may be compensated for by using a complementary communication network, such as for example a radio-frequency (RF) communication network, intended to supplement the powerline communication network, should the latter prove to be inoperative. A complementary network infrastructure is then deployed to enable the entity managing the AMM system to recover the meter readings from the smart electricity meters. The convergence of data then takes place at the entity managing the AMM system.

The deployment of this complementary network structure is however time-consuming, and requires a significant use of resources (quantity of devices for creating the infrastructure, installation time, etc.).

It is desirable to overcome these drawbacks of the prior art and in particular to enable a smart electricity meter comprising a powerline communication interface and at least one radio-frequency communication interface to connect to the system, and this in a way that is transparent vis-à-vis a centralised management device of the system.

The invention relates to a method for connecting a smart electricity meter to a system comprising a powerline communication network with reactive routing protocol to put in contact nodes of the system and a centralised management device of the system with which smart electricity meters that are nodes in the system shall be registered, each path between one said node in the system and the centralised management device consisting of a link or a set of links, each link being associated with a route cost. The system comprises at least one gateway comprising a powerline communication interface for communicating via the powerline communication network and at least one radio-frequency communication interface. A smart electricity meter seeking to connect to the system and also comprising a powerline communication interface and at least one radio-frequency communication interface performs a registration phase comprising the following steps: broadcasting, on each of its communication interfaces, an announcement request message; after reception of one or more announcement messages in response to the announcement request message from respectively one or more neighbours in the system, selecting a relay agent, the relay agent being the neighbour in the system having the lowest route cost for joining the centralised management device, each announcement message including information on the cost of the route between the neighbour that sent the announcement message and the centralised management device; and making a request for registration of said smart electricity meter with the centralised management device, using the selected relay agent as proxy via the communication interface via which the relay agent sent the announcement message that enabled obtaining said lowest route cost. In addition, the route costs of links relying on powerline communication interfaces and radio-frequency communication links are defined consistently with each other. And, after registration of said smart electricity meter, the routing of messages coming from or going to said smart electricity meter takes place in the system at the data link layer of the OSI model. Thus, by using the relay agent as a proxy for the registration phase and by acting at the data link layer for the routing, a smart electricity meter that comprises a powerline communication interface and at least one radio-frequency interface can connect to the system, and this in a way that is transparent vis-à-vis the centralised management device.

According to a particular embodiment, after registration of said smart electricity meter, a route-search procedure by successive broadcasts is implemented between the centralised management device and said smart electricity meter in order to update local routing tables at the data link layer of the OSI model, and, when the communication interface via which the relay agent sent the announcement message that enabled obtaining said lowest route cost is a radio-frequency communication interface, the relay agent enters in its local routing table at the data link layer of the OSI model the fact that the routing of the messages coming from or going to said smart electricity meter takes place via said radio-frequency communication interface.

According to a particular embodiment, the data link layer of the OSI model of each gateway is broken down into a set of medium access control sublayers specific to said communication interfaces of said gateway and an adaptation sublayer interfacing the network layer of the OSI model with the medium access control sublayers, the routing of messages in the system being performed by said gateway at the adaptation sublayer.

According to a particular embodiment, each of the medium access control sublayers implements the same medium access control mechanism for communicating between neighbours, a packet fragmentation and reassembly mechanism, an automatic request repetition mechanism and a continuous medium listening mechanism when said gateway is not transmitting on the medium in question.

According to a particular embodiment, the routing of messages in the system taking place via the adaptation sublayer is in accordance with the 6LoWPAN protocol.

According to a particular embodiment, when said smart electricity meter is registered in the system and furthermore the communication interface via which the relay agent sent the announcement message that enabled obtaining the lowest route cost is the powerline communication interface, said smart electricity meter adopts the role of gateway in the system.

According to a particular embodiment, when said smart electricity meter is registered in the system and furthermore the communication interface via which the relay agent sent the announcement message that enabled obtaining the lowest route cost is one said radio-frequency communication interface, said smart electricity meter does not respond to any announcement request messages coming from other smart electricity meters.

According to a particular embodiment, when furthermore the communication interface via which the relay agent sent the announcement message that enabled obtaining said lowest route cost is one said radio-frequency communication interface, said smart electricity meter establishes with the relay agent a first monitoring mechanism consisting of exchanging, via said radio-frequency communication interface, radio connectivity check messages, and said smart electricity meter reinitiates the registration phase when the first monitoring mechanism shows a loss of radio connectivity.

According to a particular embodiment, when furthermore the communication interface via which the relay agent sent the announcement message that enabled obtaining the lowest route cost is one said radio-frequency communication interface, said smart electricity meter establishes with the relay agent a second monitoring mechanism consisting of exchanging with the centralised management device keep-alive messages and/or other application messages, and said smart electricity meter reinitiates the registration phase when the second monitoring mechanism shows a loss of contact with the centralised management device.

The invention also relates to a smart electricity meter intended to be used in a system comprising a powerline communication network with reactive routing protocol for putting in contact nodes in the system and a centralised management device of the system with which smart electricity meters that are nodes in the system shall be registered, each path between one said node in the system and the centralised management device consisting of a link or a set of links, each link being associated with a route cost. The system comprises at least one gateway comprising a powerline communication interface for communicating via the powerline communication network and at least one radio-frequency communication interface. Said smart electricity meter, seeking to connect to the system and also comprising a powerline communication interface and at least one radio-frequency communication interface, comprises means for performing a registration phase comprising: means for broadcasting an announcement request message on each of its communication interfaces; means for, after reception of one or more announcement messages in response to the announcement request message from respectively one or more neighbours in the system, selecting a relay agent, the relay agent being the neighbour in the system having the lowest route cost for joining the centralised management device, each announcement message including information on route cost between the neighbour that sent said announcement message and the centralised management device; and means for making a request for registration of said smart electricity meter with the centralised management device, using the selected relay agent as a proxy via the communication interface via which the relay agent sent the announcement message that enabled obtaining said lowest route cost. In addition, the route costs of link relying on powerline communication interfaces and radio-frequency communication links are defined so as to be consistent with each other. And, after registration of said smart electricity meter, the routing of messages coming from or going to said smart electricity meter takes place at the data link layer of the OSI model.

The invention also relates to a method implemented by a gateway in a system further comprising a powerline communication network with reactive routing protocol for putting in contact nodes of the system and a centralised management device of the system with which smart electricity meters that are nodes in the system shall be registered, each path between one said node in the system and the centralised management device consisting of a link or a set of links, each link being associated with a route cost. Said gateway comprises a powerline communication interface for communicating via the powerline communication network and at least one radio-frequency communication interface. When a smart electricity meter seeking to connect to the system and also comprising a powerline communication interface and at least one radio-frequency communication interface performs a registration phase, said gateway, in a first configuration, performs the following steps: receiving an announcement request message; transmitting, in response to the announcement request message and on each communication interface via which said announcement request message was received, an announcement message including information on route cost between said gateway and the centralised management device; and, on request for registration of said smart electricity meter with the centralised management device, adopting a proxy role vis-à-vis said smart electricity meter for propagating said registration request in the powerline communication network. In addition, the route costs of links relying on powerline communication interfaces and radio-frequency communication links are defined so as to be consistent with each other. And, after registration of said smart electricity meter, the gateway is configured so that the routing of messages coming from or going to said smart electricity meter takes place at the data link layer of the OSI model.

According to a particular embodiment, in a second configuration, said gateway is connected directly to the centralised management device via its radio-frequency communication interface, said gateway ignores any announcement request message received coming from one said smart electricity meter via its radio-frequency communication interface, said gateway ignores any registration request, received via its powerline communication interface, for a smart electricity meter that is not adjacent to said gateway, and said gateway otherwise acts in the second configuration as in the first configuration.

According to a particular embodiment, said gateway is connected directly to the centralised management device by way of a link relying on a cellular telecommunication network.

The invention also relates to a gateway intended to be used in a system comprising a powerline communication network with reactive routing protocol for putting in contact nodes in the system and a centralised management device of the system with which smart electricity meters that are nodes in the system shall be registered, each path between one said node in the system and the centralised management device consisting of a link or a set of links, each link being associated with a route cost. Said gateway comprises a powerline communication interface for communicating via the powerline communication network and at least one radio-frequency communication interface. When a smart electricity meter seeking to connect to the system and also comprising a powerline communication interface and at least one radio-frequency communication interface performs a registration phase, said gateway comprises: means for receiving an announcement request message; means for transmitting, in response to the announcement request message and on each communication interface via which said announcement request message was received, an announcement message including information on route cost between said gateway and the centralised management device; means for, on a request for registration of said smart electricity meter with the centralised management device, adopting a proxy role vis-à-vis said smart electricity meter for propagating said registration request in the powerline communication network. In addition, the route costs of links relying on powerline communication interfaces and radio-frequency communication links are defined so as to be consistent with each other. And, after registration of said smart electricity meter, the gateway is configured so that the routing of messages coming from or going to said smart electricity meter takes place at the data link layer of the OSI model.

The invention also relates to a computer program, which can be stored on a medium and/or downloaded from a communication network, in order to be read by a processor. This computer program comprises instructions for implementing one or other of the methods mentioned above in any of the embodiments thereof, when said program is executed by the processor. The invention also relates to an information storage medium comprising such a computer program.

The features of the invention mentioned above, as well as others, will emerge more clearly from a reading of the following description of an example embodiment, said description being given in relation to the accompanying drawings, among which:

The system shown in FIG. 1 comprises a powerline communication network (represented by solid arrows) intended to interconnect smart electricity meters and to enable them to communicate with a base node, referred to here as the MNC (multimedia networking coordinator) device 110, to transmit to it in particular meter readings. The term "multimedia" in this context is to be taken in its etymology intended to say "a plurality of connection means". The powerline communication network is meshed, which enables any one smart electricity meter to have available potentially a plurality of paths reaching the MNC device 110, and vice versa. In such a meshed network, some nodes then serve as relays to enable one or more other nodes to communicate with the MNC device 110. Node means any device able to be included in the system in order to communicate with other devices in the system.

The MNC device 110 is responsible for managing the powerline communication network. The MNC device 110 is responsible for allocating data link layer addresses to each node in the system, to enable said node to communicate within the system. The MNC device 110 therefore fulfils the role of centralised system-management device.

The powerline communication network relies on a routing protocol of the reactive type, such as the LOADng protocol ("Lightweight On-demand Ad hoc Distance-vector Routing Protocol—Next Generation"). Unlike routing protocols of the proactive type that rely on global network-topology knowledge, a routing protocol of the reactive type relies on discoveries of routes on demand, each node in the network needing to have knowledge only of its own neighbours (i.e. the nodes with which said network node can communicate directly, without relays via another node in the network). In the context of powerline communication technologies, the routing protocol used by the G3-PLC standard is of the reactive type, whereas the one used in the PRIME ("PoweRline Intelligent Metering Evolution") specifications is of the proactive type.

Figure 1A:
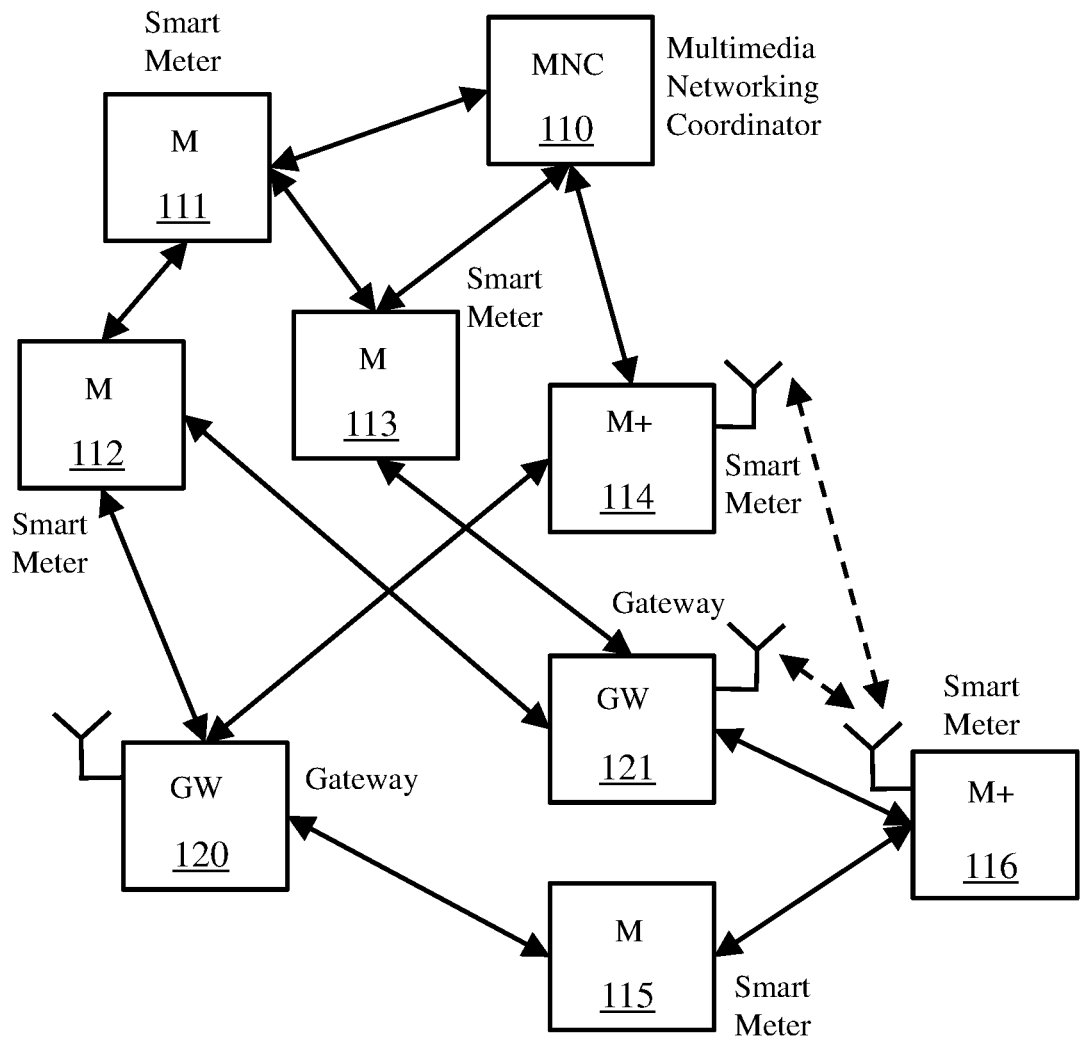
FIG. 1A illustrates schematically a communication system in the context of automated remote management of smart electricity meters.

The system shown in FIG. 1A comprises a plurality of smart electricity meters. Some smart electricity meters may comprise only one communication interface, of the powerline type for communicating with the MNC device 110. These are the smart electricity meters M 111, 112, 113, 115 in FIG. 1A. Some smart electricity meters may comprise a powerline communication interface as well as at least one other radio-frequency communication interface for communicating with the MNC device 110. These are the smart electricity meters M+ 114, 116 in FIG. 1A.

The system shown in FIG. 1A may comprise one or more gateways GW 120, 121. Like the smart electricity meters M+ 114, 116, the gateways GW 120, 121 comprise a powerline communication interface as well as at least one other radio-frequency communication interface. These gateways GW 120, 121 do not have a metering function, but are intended to relay between the powerline communication network and a smart electricity meter, such as the smart electricity meter M 116, communicating via a radio-frequency communication interface (as shown by arrows in broken lines in FIG. 1A). The gateways GW may adapt to an existing powerline network, which means that there is no need to change an existing node in said network in order to introduce therein the functions performed by these gateways GW.

Once registered in the system and connected via its powerline communication interface, each smart electricity meter M+, such as the smart electricity meter M+ 114, may also relay between the powerline communication network and another smart electricity meter communicating via a radio-frequency communication interface. The smart electricity meter M+ 114 has thus adopted the role of gateway in the system. Apart from the question of the metering function, one difference between the gateways GW 120, 121 and the smart electricity meters M+ 114, 116 lies in the fact that the gateways GW 120, 121 cannot register themselves in the system via their radio-frequency communication interface.

The radio-frequency communication interfaces used in the system are for example of the LoRaWAN type (radio range of several kilometers in free field). The gateways GW and the electricity meters M+ using their radio-frequency communication interfaces are then all the time listening out on the medium, in order to allow the establishment of asynchronous bidirectional communications. The radio-frequency communication interfaces used in the system are for example of the KNX RF type (radio range of 100 meters in free field), as described in ISO/IEC 14543-3-x. In the case where the system is supposed to have a high density of electricity meters, these radio-frequency communication interfaces used in the system are for example of the IEEE 802.15.4 type (radio range of 10 meters in free field) in non-beacon mode. These radio-frequency communication interfaces may use a proprietary technology in the ISM (industrial, scientific and medical) band.

Since the smart electricity meters M+ 114, 116 have both a powerline communication interface and at least one radio-frequency communication interface, it is possible for them to use one or other of these communication interfaces to register themselves in the system. A specific procedure is applied so as to optimise the communication performances with these smart electricity meters M+ 114, 116 and this in a manner that is transparent for the MNC device 110. This aspect is detailed below in relation to FIGS. 3, 4A, 4B, 5A and 5B.

We consider hereinafter, by way of illustration and for reasons of simplification of the description, that the smart electricity meters M+ 114, 116 and the gateways GW 120, 121 each have a single communication interface of the RF type (according to the same radio-frequency technology).

It should be noted that a gateway GW may be integrated in the MNC device 110, so as to be able to connect one or more smart electricity meters M+ directly to the MNC device 110.

Figure 1B:
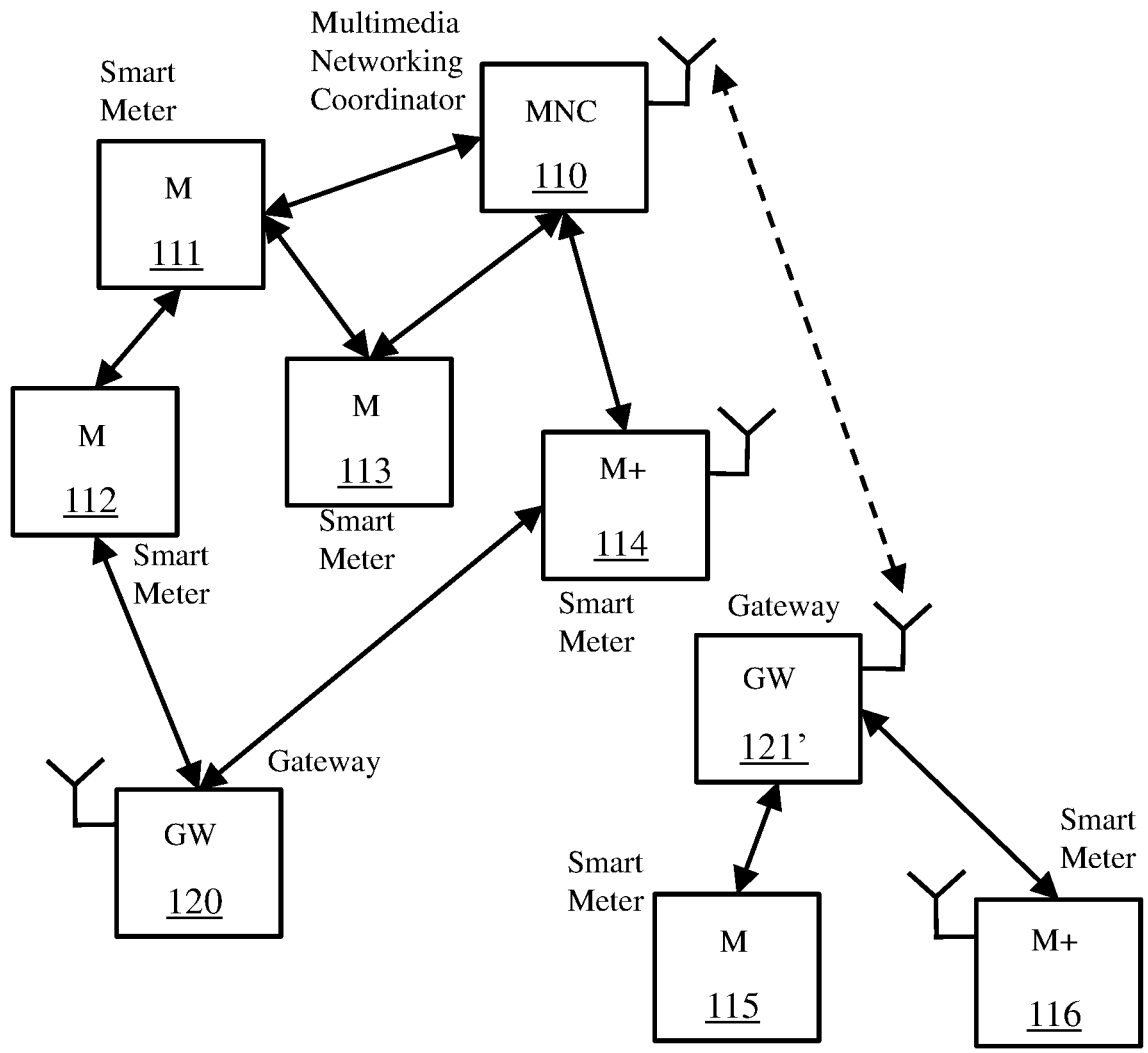
FIG. 1B illustrates schematically another communication system in the context of the automated remote management of smart electricity meters.

FIG. 1B illustrates schematically another communication system in the context of an automated remote management of smart electricity meters. In comparison with the system in FIG. 1A, the system in FIG. 1B is distinguished by the fact that a gateway GW is integrated in the MNC device 110, as well as by the possibility of using one or more gateways GW in a configuration other than the one described in relation to FIG. 1A.

FIG. 1B therefore presents a gateway GW 121' that is connected to the MNC device 110 via its radio-frequency communication interface. In a particular embodiment, the radio-frequency communication interface thus used is a communication interface with a cellular telecommunication network, for example of the LTE (Long-Term Evolution) type.

In this configuration, the gateway GW 121' enables connecting smart electricity meters M or M+ to the system by way of its powerline communication interface, as illustrated in FIG. 1B. As the gateway GW 121' relies on its radio-frequency communication interface for making the connection with the MNC device 110, the gateway GW 121' does not allow the formation of a cluster of smart electricity meters via its powerline communication interface, that is to say, in this configuration, the gateway GW 121' allows only its own neighbours on the powerline communication interface to benefit from the relay, to the MNC device 110, performed by way of its radio-frequency communication interface. A specific processing of registration request messages JOIN-REQUEST is consequently applied, as described below in relation to FIG. 5A. Other smart electricity meters that attempted to integrate in the system via the gateway GW 121' in this configuration by way of their radio-frequency communication interfaces would be rejected. A specific processing of announcement request messages BEACON-REQUEST is consequently applied, as described below in relation to FIG. 4B.

Thus, in a particular embodiment, each gateway GW is capable of being configured for use according to the configuration described above in relation to FIG. 1A and for use according to the configuration described above in relation to FIG. 1B, these two uses being exclusive of one another. For example, on installation, an installer chooses in which configuration said gateway GW is placed. According to another approach, the configuration described above in relation to FIG. 1B is adopted by said gateway GW when, at start-up, said gateway GW cannot get into contact with the MNC device 110 via its powerline communication interface.

It is also possible for the communication system in the context of the automated remote management of smart electricity meters to comprise gateways GW that may solely be configured in one or other of the configurations described above in relation to FIGS. 1A and 1B.

Figure 2:
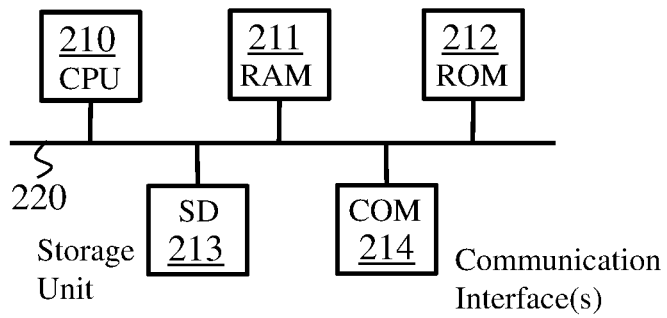
FIG. 2 illustrates schematically an example of hardware architecture of a communication device of the system in FIG. 1A and/or FIG. 1B.

FIG. 2 illustrates schematically an example of hardware architecture of a communication device of the system in FIG. 1A and/or FIG. 1B, whether it be a smart electricity meter M+ or a gateway GW.

The communication device in question then comprises, connected by a communication bus 220: a processor or CPU (central processing unit) 210; a random access memory (RAM) 211; a read only memory (ROM) 212; a storage unit 213, such as a hard disk HDD (hard disk drive), or a storage medium reader such as an SD (secure digital) card reader; one or more communication interfaces 214 enabling the communication device to communicate within said system, as mentioned above in relation to FIG. 1A and FIG. 1B. In the case where the communication device is a smart electricity meter M+, the communication device further comprises a metering unit configured to read an electricity consumption of an electrical installation that said smart electricity meter M+ is responsible for monitoring.

The processor 210 is capable of executing instructions loaded into the RAM memory 211 from the ROM memory 212, from an external memory (not shown), from a storage medium (such as an SD card), or from a communication network. When the communication device is powered up, the processor 210 is capable of reading instructions from the RAM memory 211 and executing them. These instructions form a computer program causing the implementation, by the processor 210, of all or some of the algorithms and steps described below in relation to the communication device in question.

All or some of the algorithms in the steps described below may be implemented in software form by the execution of a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit).

Figure 3:
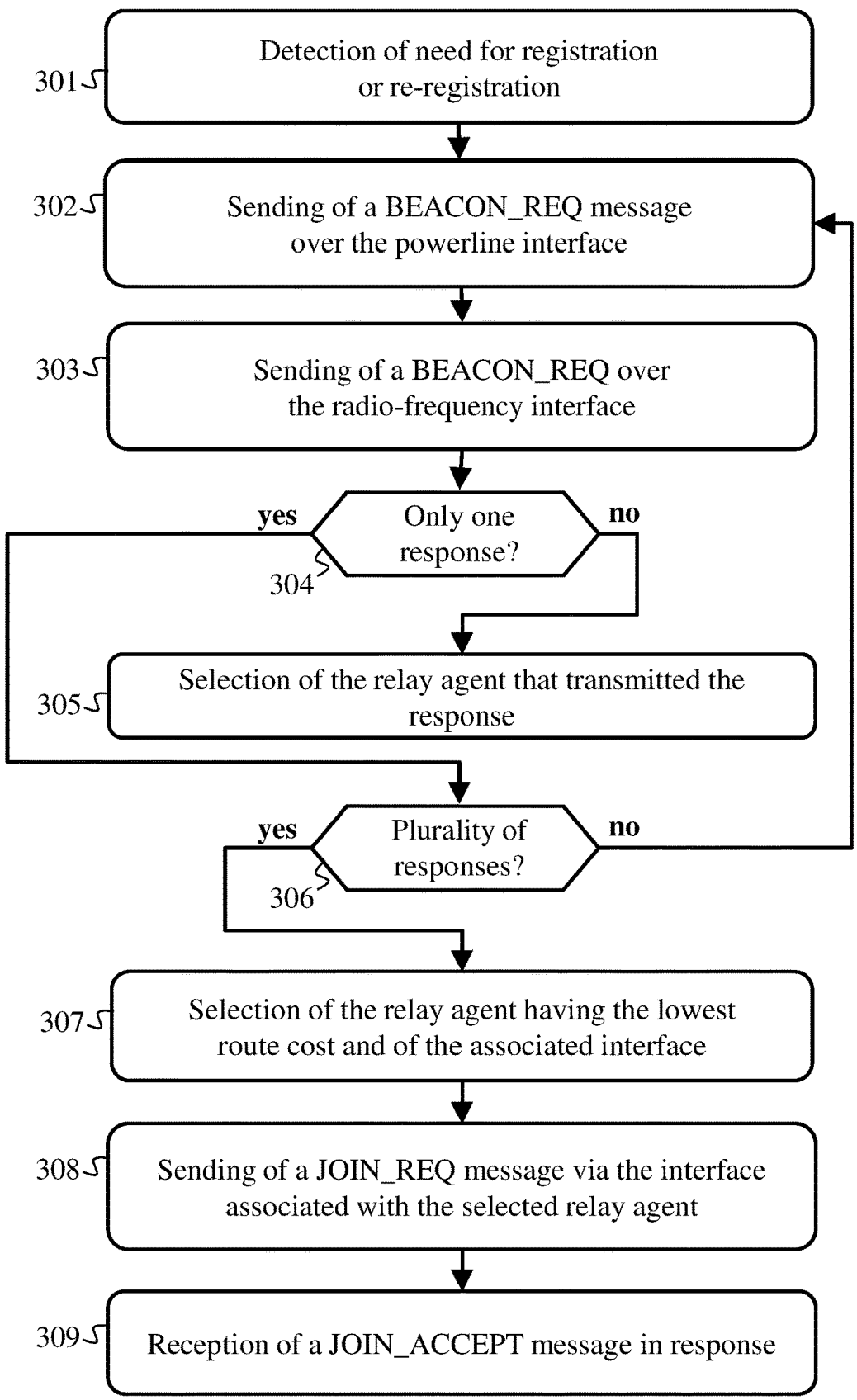
FIG. 3 illustrates schematically an algorithm, executed by a smart electricity meter, for selecting a relay agent in the system in FIG. 1A and/or FIG. 1B.

FIG. 3 illustrates schematically an algorithm, executed by each smart electricity meter M+, for performing a registration phase in said system, selecting a relay agent that will play a proxy role vis-à-vis said smart electricity meter M+ in the system in FIG. 1A or FIG. 1B. A relay agent is a device, already registered in the system, via which said smart electricity meter M+ will communicate with the powerline communication network. This will therefore be either via its powerline communication interface or via its radio-frequency communication interface (or one of its radio-frequency communication interfaces). Let us consider by way of illustration that the algorithm in FIG. 3 is executed by the smart electricity meter M+ 116.

In a step 301, the smart electricity meter M+ 116 detects that it has to register itself in the system or to re-register in the system. The smart electricity meter M+ shall therefore register itself in the system when the smart electricity meter M+ 116 is brought into service. The smart electricity meter M+ shall re-register in the system when the smart electricity meter M+ 116 was already registered in the system but has lost contact with the MNC device 110.

The smart electricity meter M+ 116 then broadcasts an announcement request message, called BEACON-REQUEST, on each of its communication interfaces. The smart electricity M+ 116 thus seeks to determine which are its possible neighbours in the system. Thus, in a step 302, the smart electricity meter M+ 116 broadcasts this announcement request message BEACON-REQUEST via its powerline communication interface. According to the example of the system in FIG. 1A, this announcement request message BEACON-REQUEST is received by the smart electricity meter M 115 via its powerline communication interface. According to the example of the system in FIG. 1A, this announcement request message BEACON-REQUEST is also received by the gateway GW 121 via its powerline communication interface. In addition, in a step 303, the smart electricity meter M+ 116 broadcasts this announcement request message BEACON-REQUEST via its radio-frequency communication interface. When the smart electricity meter M+ 116 has available a plurality of radio-frequency communication interfaces, the smart electricity meter M+ 116 proceeds thus for each of its radio-frequency communication interfaces. According to the example of the system in FIG. 1A, this announcement request message BEACON-REQUEST is received by the gateway GW 121 via its radio-frequency communication interface, and is received by the smart electricity meter M+ 114 via its radio-frequency communication interface. It should therefore be noted that, according to the example of the system in FIG. 1A, the gateway GW 121 receives the announcement request message BEACON-REQUEST via each of its two communication interfaces. The other devices registered in the system are considered, illustratively in the context of the system in FIG. 1A, to be outside the range of the smart electricity meter M+ 116.

The smart electricity meter M+ 116 then awaits a response to the announcement request message BEACON-REQUEST that was transmitted at steps 302 and 303. After a predefined waiting time, in a step 304, the smart electricity meter M+ 116 checks whether a single announcement message BEACON-RESPONSE has been received in response. If such is the case, a step 305 is performed; otherwise a step 306 is performed.

In step 305, the smart electricity meter M+ 116 selects as a relay agent the node that transmitted the single announcement message BEACON-RESPONSE received. The smart electricity meter M+ 116 stores in memory via which communication interface said announcement message BEACON-RESPONSE was received, in order to know via which communication interface to contact said relay agent in order to communicate with the MNC device 110. The algorithm in FIG. 3 is then ended.

In step 306, the smart electricity meter M+ 116 checks whether several announcement messages BEACON-RESPONSE have been received in response. If such is the case, step 307 is performed; otherwise the smart electricity meter M+ 116 will continue to probe its communication interface in the search for any neighbours in the system, reiterating step 302.

In step 307, the smart electricity meter M+ 116 recovers, in each announcement message BEACON-RESPONSE received, information on route cost between the node that sent said announcement message BEACON-RESPONSE and the MNC device 110. The smart electricity meter M+ 116 next updates each item of route cost information thus recovered, adding an additional route cost due to the connection between said node that transmitted said announcement message BEACON-RESPONSE in question and the smart electricity meter M+ 116. This additional route cost therefore depends on the communication interface, by powerline or radio frequency, via which said announcement message BEACON-RESPONSE in question was received by the smart electricity meter M+ 116, since these two communication interfaces typically have different route costs.

The route costs are routing metrics enabling deciding which route to choose when a plurality of routes enable establishing a communication between two nodes in the system. Each route or pathway consists of one or more links, each link being associated with a route cost. The route cost associated with a pathway is the sum of the route costs of the links constituting the pathway or the route cost of the link constituting the pathway. The route costs are a conventional concept of routing in meshed communication networks. The route costs may rely on criteria of achievable bit rate and/or transmission latency and/or ratio between bandwidth required for establishing said route and bandwidth still available and/or quantity of processing resources required and/or signal to noise ratio and/or loss rate. Other criteria may be used, the route costs being not absolute information but relative for comparing the impact of establishing one route rather than another. For example, the use of a modulation and coding scheme of the BPSK (binary phase-shift keying) type on a link has a higher route cost than a modulation and coding scheme of the QPSK (quadrature phase-shift keying) type, itself having a higher route cost than a modulation and coding scheme of the 8PSK (8-phase shift keying) type. According to another example, a repetition scheme with three repetitions on a link has a higher route cost than a repetition scheme with two repetitions, itself having a higher route cost than a repetition scheme with one repetition. The definition of the aforementioned additional route cost may in particular use information representing transmission quality detected on reception of the announcement message BEACON-RESPONSE via the concerned link.

Route costs via powerline links and via radio-frequency links are defined in a way that is consistent with each other, that is to say the same route cost scale is used in both cases. For example, considering by way of illustration that the route cost of a link is dependent essentially on the ratio between the bandwidth required for establishing said route and the bandwidth still available on said link, the route costs will be the same whether the link is by powerline or radio frequency for identical ratios. For example, considering:

powerline links on which modulation and coding schemes of the 8PSK, QPSK, BPSK and ROBO type (the latter being a modulation and coding scheme based on a BPSK modulation and coding scheme with bit repetition) may be used, and radio-frequency links on which repetition schemes with one, two or three repetitions may be used, it is possible to establish route cost consistency in the following way:

the use of a powerline link with a modulation and coding scheme of the 8PSK type has a route cost C1;

the use of a powerline link with a modulation and coding scheme of the QPSK type has a route cost C2>C1;

the use of a radio-frequency link with a repetition scheme with one repetition has a route cost C3>C2;

the use of a powerline link with a modulation and coding scheme of the BPSK type has a route cost C4>C3;

the use of a radio-frequency link with a repetition scheme with two repetitions has a route cost C5>C4;

the use of a powerline link with a modulation and coding scheme of the ROBO type has a route cost C6>C5; and the use of a radio-frequency link with a repetition scheme with three repetitions has a route cost C7>C6.

It is also possible to establish route cost consistency by defining cost ranges for each of the modulation and coding schemes in each of the repetition schemes mentioned above, and to refine the route cost of the link in the corresponding range using one or more other criteria, such as for example the ratio between bandwidth required for establishing said route and bandwidth still available.

At the end of step 307, the smart electricity meter M+ 116 then selects as relay agent the node that transmitted the announcement message BEACON-RESPONSE that has, after addition of the aforementioned additional route cost, the lowest route cost. The smart electricity meter M+ 116 stores in memory via which communication interface the announcement message BEACON-RESPONSE in question was received, in order to know via which communication interface to contact said relay agent in order to communicate with the MNC device 110 (the relay agent may in fact be adjacent to the smart electricity meter M+ 116 via a plurality of communication interfaces).

In a step 308, the smart electricity meter M+ 116 transmits, implicitly to the MNC device 110, a message requesting registration in the system, called JOIN-REQUEST. The registration request message JOIN-REQUEST contains a unique identifier, type EUI64, identifying the smart electricity meter M+ 116 uniquely. The smart electricity meter M+ 116 transmits the registration request message JOIN-REQUEST via its communication interface stored in memory vis-à-vis the relay agent selected at step 307. The smart electricity meter M+ 116 addresses said registration request message JOIN-REQUEST to said relay agent selected at step 307, whether the communication interface stored vis-à-vis the relay agent selected at step 307 is the radio-frequency communication interface or the powerline communication interface. The relay agent in question is then responsible for transmitting, in unicast mode, the registration request message JOIN-REQUEST to the MNC device 110, using the route already established between the MNC device 110 and the relay agent in question (the route that enabled the smart electricity meter M+ 116 to select the relay agent in question at step 307). The relay agent in question then serves as a proxy vis-à-vis the smart electricity meter M+ 116. See FIGS. 5A and 5B for the behaviour of the relay agents.

The smart electricity meter M+ 116 then awaits a registration acknowledgement message, called JOIN-ACCEPT. This registration acknowledgement message JOIN-ACCEPT is transmitted by the MNC device 110 in response to the registration request message JOIN-REQUEST, and confirms the registration of the smart electricity meter M+ 116 in the system. Thus, in a step 308, the smart electricity meter M+ 116 receives, from the relay agent selected at step 307, via the communication interface stored vis-à-vis said relay agent, the registration acknowledgement message JOIN-ACCEPT expected. As detailed below in relation to FIG. 5B, the smart electricity meter M+ 116 receives only one registration acknowledgement message JOIN-ACCEPT, and this via the relay agent selected at step 307 and via the communication interface stored vis-à-vis said relay agent.

The registration acknowledgement message JOIN-ACCEPT includes a data link layer address of the OSI (Open Systems Interconnection) model, typically an address called a short address, which the MNC device 110 allocated to the smart electricity meter M+ 116. The MNC device 110 thus has available an association between the unique identifier (type EUI64, which was included in the registration request message JOIN-REQUEST, and the data link layer address allocated to the smart electricity meter M+ 116. This data link layer address is next used by the smart electricity meter M+ 116 to communicate in the system, to allow a routing of data confined to the data link layer of the OSI model. Next the algorithm in FIG. 3 is ended.

It should be noted that the procedure for registering the smart electricity meter M+ 116 may include more message exchanges than the mere exchange of JOIN-REQUEST and JOIN-ACCEPT messages mentioned above, in particular to include a procedure for authenticating and exchanging information relating to encryption keys.

After registration in the system, the smart electricity meter M+ 116 is said to be "attached" to the system via its relay agent.

As detailed below, after registration of the smart electricity meter M+ 116, the routing of messages coming from or going to said smart electricity meter M+ 116 takes place in the system at the data link layer of the OSI model without the relay agent used up until then by the smart electricity meter M+ 116 having to continue to fulfil the role of proxy.

In a particular embodiment, when the smart electricity meter M+ 116 selects a relay agent that responded via its powerline communication interface, the smart electricity meter M+ 116 adopts a role of gateway after registration of said smart electricity meter M+ 116 in the system. The smart electricity meter M+ 116 then enables any other smart electricity meter M+ to attach to the system via its radio-frequency communication interface. However, when the smart electricity meter M+ 116 is attached to the system by way of a gateway GW acting as a relay agent and this gateway GW is attached directly to the MNC device 110 by way of its radio-frequency communication interface (like the gateway GW 121' in FIG. 1B), the gateway GW 121' prevents any other smart electricity meter M+ from attaching to the system by using the smart electricity meter M+ 116 as relay agent. This aspect is addressed below in relation to FIG. 5.

Figure 4A:
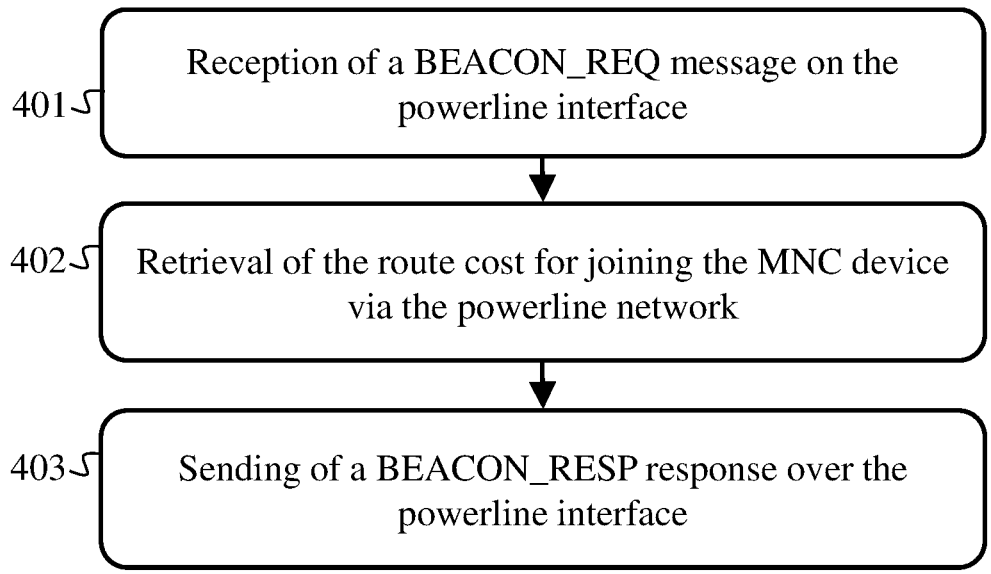
FIG. 4A illustrates schematically a first algorithm, executed by a gateway in the system in FIG. 1A and/or FIG. 1B, for responding to an announcement request.

FIG. 4A illustrates schematically an algorithm, executed by each gateway GW in the system in FIG. 1A or FIG. 1B and by each smart electricity meter M+ attached to the system via its powerline communication interface, for responding to an announcement request message BEACON-REQUEST transmitted via a powerline communication interface (as described above at step 302). Let us consider by way of illustration that the algorithm in FIG. 4A is executed by the gateway GW 121.

In a step 401, the gateway GW 121 receives, via its powerline communication interface, the announcement request message BEACON-REQUEST in question.

In a step 402, the gateway GW 121 recovers route cost information relating to the route used for communicating between said gateway GW 121 and the MNC device 110. In the case of the gateway GW 121 (FIG. 1A), the route cost between the gateway GW 121 and the MNC device 110 is determined by broadcasting route discovery messages, called RREQ, over the powerline communication network. The route in question uses as a medium only the powerline communication network. A typical procedure is described in the G3-PLC standard and is applicable to powerline communication networks with a routing protocol of the reactive type. In the case of the gateway GW 121' (FIG. 1B), the route cost between said gateway GW 121' and the MNC device 110 is the route cost associated with the radio-frequency link that directly connects said gateway GW 121' and the MNC device 110. In particular when the radio-frequency link that directly connects said gateway GW 121' and the MNC device 110 uses a cellular telecommunication network, the route cost of said link may be defined so as to favour any alternative of communicating via the powerline communication network.

In a step 403, the gateway GW 121 transmits, via its powerline communication interface in response to the announcement request message BEACON-REQUEST, an announcement message BEACON-RESPONSE including the route cost information recovered at step 402. The algorithm in FIG. 4A is then ended.

It should be noted that the gateway GW 121 does not propagate the announcement request message BEACON-REQUEST received via its powerline communication interface at step 401. Likewise the gateway GW 121 does not propagate any announcement message BEACON-RESPONSE received, coming from another node, by the gateway GW 121 via its powerline communication interface. The exchanges of announcement request messages BEACON-REQUEST and of announcement messages BEACON-RESPONSE therefore take place solely between neighbours.

Figure 4B:
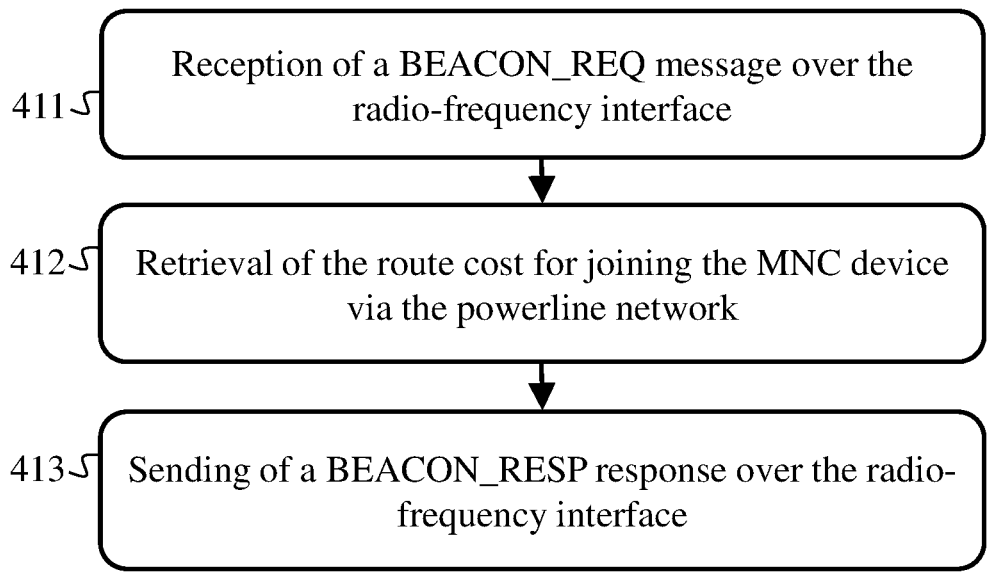
FIG. 4B illustrates schematically a second algorithm, executed by said gateway in the system in FIG. 1A and/or FIG. 1B, for responding to another announcement request.

FIG. 4B illustrates schematically an algorithm, executed by each gateway GW in the system and by each smart electricity meter M+ attached to the system via its powerline communication interface, for responding to an announcement request message BEACON-REQUEST transmitted via a radio-frequency communication interface (as described above at step 303). Let us consider by way of illustration that the algorithm in FIG. 4B is executed by the gateway GW 121.

In a step 411, the gateway GW 121 receives, via its radio-frequency communication interface, the announcement request message BEACON-REQUEST in question. However, when the gateway GW in question is connected directly to the MNC device 110 by a radio-frequency link (e.g. the gateway GW 121' in FIG. 1B), said gateway GW in question ignores any announcement request message BEACON-REQUEST received via its radio-frequency communication interface.

In a step 412, the gateway GW 121 recovers route cost information relating to the route used for communicating between said gateway GW 121 and the MNC device 110. Step 412 is identical to step 402 described above.

In a step 413, the gateway GW 121 transmits, via its radio-frequency communication interface in response to the announcement request message BEACON-REQUEST, an announcement message BEACON-RESPONSE including the route cost information recovered at step 412. The algorithm in FIG. 4B is then ended.

It should be noted that the gateway GW 121 does not propagate the announcement request message BEACON-REQUEST received via its radio-frequency communication interface at step 411. Likewise the gateway GW 121 does not propagate any announcement message BEACON-RESPONSE received, from another node, by the gateway GW via its radio-frequency communication interface. Here also, the exchanges of announcement request messages BEACON-REQUEST and announcement messages BEACON-RESPONSE therefore occur solely between neighbours. The behaviour is the same for each smart electricity meter M+ attached to the system via its powerline communication interface.

It should be noted that a smart electricity meter M+ of the system that is attached to the system via its radio-frequency communication interface does not respond to the announcement request messages BEACON-REQUEST, including any of those received by its powerline communication interface.

Figure 5A:
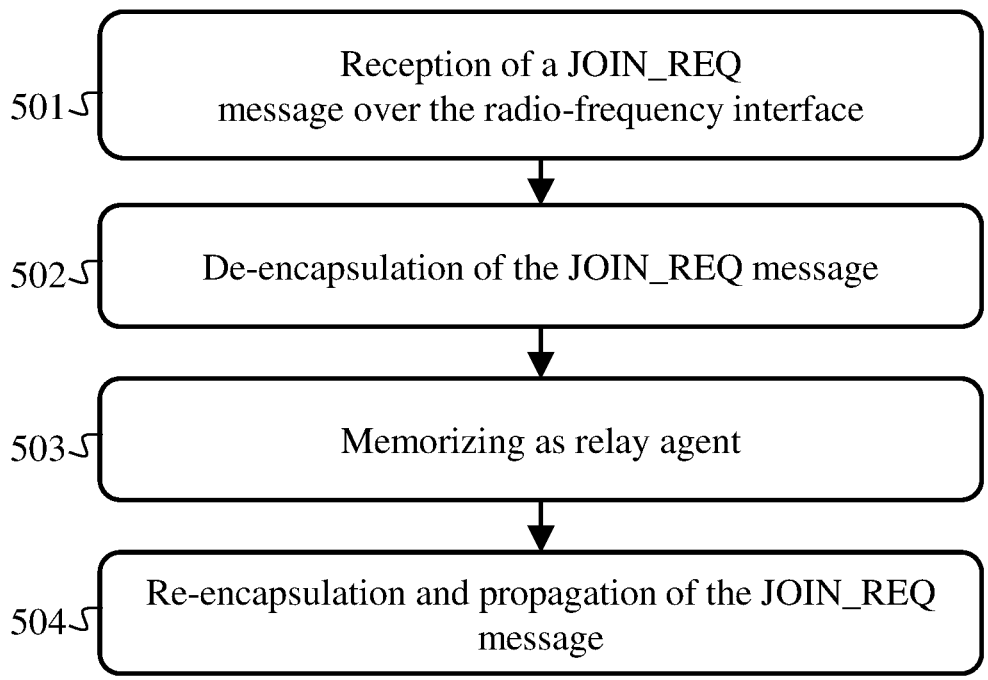
FIG. 5A illustrates schematically an algorithm, executed by said gateway of the system in FIG. 1A, for processing a registration request message.

FIG. 5A illustrates schematically an algorithm, executed by each gateway GW in the system, for processing a registration request message JOIN-REQUEST received via its radio-frequency communication interface. The algorithm in FIG. 5A is also executed by each smart electricity meter M+ that has adopted the role of gateway. Let us consider by way of illustration that the algorithm in FIG. 5A is executed by the gateway GW 121.

In a step 501, the gateway GW 121 receives, via its radio-frequency communication interface, the registration request message JOIN-REQUEST in question (as transmitted at step 308).

In a step 502, the gateway GW 121 de-encapsulates the registration request message JOIN-REQUEST so as to keep only the data (header(s) and useful data) independent of the transmission medium. For more details, see FIGS. 8A to 8F described below.

In a step 503, the gateway GW 121 stores the fact that said gateway GW 121 is selected as a relay agent by the smart electricity M+ in question (see step 307 described above), since the registration request message JOIN-REQUEST was specifically addressed to it. Storing the fact that said gateway GW 121 is selected as a relay agent by the smart electricity meter M+ in question enables in particular subsequently to update a local routing table, at the time of establishment of a route between said smart electricity meter M+ and the MNC device 110. The gateway GW 121 also knows that the registration request message JOIN-REQUEST shall, by nature, be propagated to the MNC device 110.

Then, in a step 504, the gateway GW 121 re-encapsulates the registration request message JOIN-REQUEST to enable propagation thereof over the powerline communication network. For more details, see FIGS. 8A to 8F described below. The gateway GW 121 then propagates the registration request message JOIN-REQUEST over the powerline communication network to enable the MNC device to receive it. The algorithm in FIG. 5A is then ended.

As long as a route is not established (even if the route cost is known in advance by way of the mechanism for exchanging BEACON-REQUEST and BEACON-RESPONSE messages), the local routing tables in the data link layer of the nodes in the network do not allow to gradually propagate the registration request message JOIN-REQUEST from the smart electricity meter M+ in question to the MNC device 110. A route being however already established between the relay agent and the MNC device 110, this route is used to propagate the registration request message JOIN-REQUEST. The relay agent uses its own data link layer address as the source address, which enables the MNC device 110 to subsequently return to it a registration acknowledgement request JOIN-ACCEPT that the relay agent is then responsible for propagating to the smart electricity meter M+ in question (see FIG. 5B).

When the gateway GW 121 receives, via its powerline communication interface, a registration request message JOIN-REQUEST in question (as transmitted at step 308), said message is also specifically addressed to said gateway GW 121. The gateway GW 121 shall also subsequently act as a relay agent for the registration acknowledgement message JOIN-ACCEPT that follows the registration request message JOIN-REQUEST in question. A route already being established between the relay agent and the MNC device 110, the relay agent uses here also its own data link layer address as the source address, which enables the MNC device 110 to subsequently return to it a registration acknowledgement message JOIN-ACCEPT that the relay agent is then responsible for propagating to the smart electricity meter M+ in question.

Given that the relay agent acts on behalf of the smart electricity meter M+ in question in the propagation of the registration request message JOIN-REQUEST, the relay agent in question serves as a proxy vis-à-vis the smart electricity meter M+ 116.

However, in the particular configuration of the gateway GW 121' described in relation to FIG. 1B, said gateway GW 121' is directly connected to the MNC device 110 via its radio-frequency communication interface and does not allow the formation of clusters via its powerline communication interface. The gateway GW 121' then, on reception of a registration request message JOIN-REQUEST via its powerline communication interface, checks whether said message is at the initiative of a neighbour or whether this neighbour is merely relaying said message. In the latter case, as described below, the layer address of said neighbour appears in the registration request message JOIN-REQUEST for the purpose of routing in the system at the data link layer of the OSI model. If the registration request message JOIN-REQUEST is not at the initiative of a neighbour, the gateway GW 121' ignores said registration request message JOIN-REQUEST, which prevents registration of the node in the system at the initiative of said registration request message JOIN-REQUEST. If the registration request message JOIN-REQUEST is at the initiative of a neighbour, the gateway GW 121' stores the fact that said gateway GW 121' is selected as a relay agent by the smart electricity meter M+ in question, re-encapsulates the registration request message JOIN-REQUEST to enable transmission thereof via its radio-frequency communication interface and transmits the registration request message JOIN-REQUEST to the MNC device 110 via its radio-frequency communication interface.

Figure 5B:
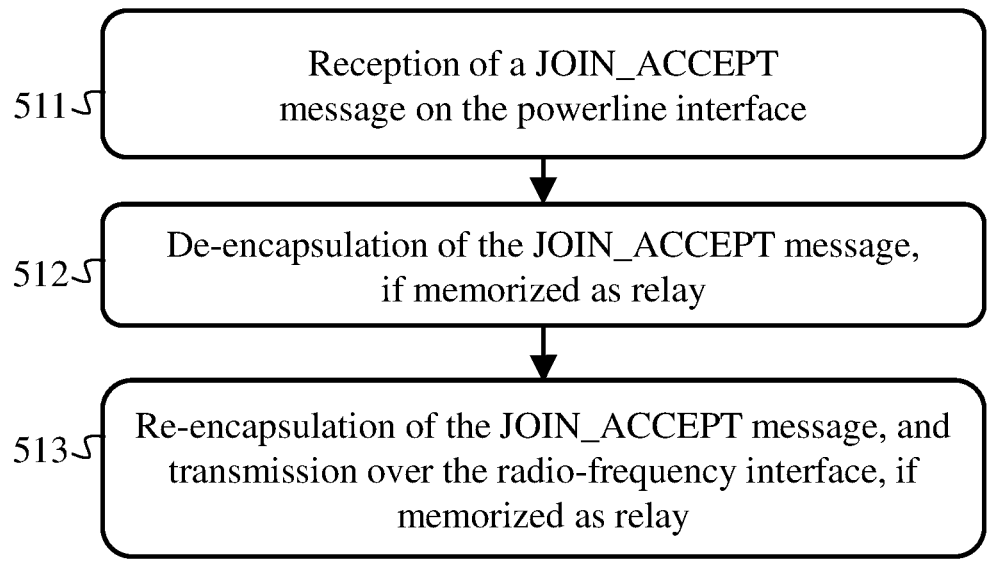
FIG. 5B illustrates schematically an algorithm, executed by said gateway of the system in FIG. 1A, for processing a message responding to said registration request.

FIG. 5B illustrates schematically an algorithm, executed by each gateway GW in the system, for processing a registration acknowledgement message JOIN-ACCEPT concerning a smart electricity meter M+ for which said gateway GW acts as a relay agent via its radio-frequency communication interface. The algorithm in FIG. 5B is also executed by each smart electricity meter M+ that has adopted the role of gateway, vis-à-vis any other smart electricity meter M+ for which said smart electricity meter M+ acts as a relay agent via its radio-frequency communication interface. Let us consider by way of example that the algorithm in FIG. 5B is executed by the gateway GW 121.

In a step 511, the gateway GW 121 receives, via its powerline communication interface, the registration acknowledgement message JOIN-ACCEPT in question, as transmitted by the MNC device 110. As the registration request message JOIN-REQUEST to which the registration acknowledgement message JOIN-ACCEPT responds comprises, as the data link layer source address, that of the gateway GW 121, said registration acknowledgement message JOIN-ACCEPT was sent by the MNC device 110 to the gateway GW 121. The gateway GW 121 is responsible for propagating said registration acknowledgement message JOIN-ACCEPT to the electricity meter M+ that had initially transmitted the registration request message JOIN-REQUEST to which said registration acknowledgement message JOIN-ACCEPT responds.

In a step 512, the gateway GW 121 detects that it has been selected as a relay agent by the smart electricity meter M+ to which the registration acknowledgement message JOIN-ACCEPT relates (storage at step 503). The gateway GW 121 de-encapsulates the registration acknowledgement message JOIN-ACCEPT so as to keep only the data (header(s) and useful data) independent of the transmission medium. For more details, see FIGS. 8A to 8F described below, and this for the purpose of next transmitting it via its radio-frequency communication interface.

In a step 513, the gateway GW 121 re-encapsulates the registration acknowledgement message JOIN-ACCEPT to enable transmission thereof via its radio-frequency communication interface. For more details, see FIGS. 8A to 8F described below. The gateway GW 121 then transmits the registration acknowledgement message JOIN-ACCEPT via the radio-frequency communication interface to enable the concerned smart electricity meter M+ to receive it. The registration acknowledgement message JOIN-ACCEPT is here specifically addressed to the concerned smart electricity meter M+. The algorithm in FIG. 5B is then ended. If the registration acknowledgement message JOIN-ACCEPT relates to a smart electricity meter M+ for which said gateway GW acts as a relay agent via its powerline communication interface, the gateway GW 121 modifies the registration acknowledgement message JOIN-ACCEPT by sending specifically said registration acknowledgement message JOIN-ACCEPT to said smart electricity meter M+ and transmits the message thus modified via its powerline communication interface.

However, in the particular configuration of the gateway GW 121 described in relation to FIG. 1B, said gateway GW 121 receives the registration acknowledgement message JOIN-ACCEPT via its radio-frequency communication interface directly from the MNC device 110. The gateway GW 121' detects that it has been selected as a relay agent by the smart electricity meter M+ to which the registration acknowledgement message JOIN-ACCEPT relates and de-encapsulates the registration acknowledgement message JOIN-ACCEPT, so as to keep only the data (header(s) and useful data) independent of the transmission medium. Then the gateway GW 121' re-encapsulates the registration acknowledgement message JOIN-ACCEPT to enable transmission thereof via its powerline communication interface.

As the registration acknowledgement message JOIN-ACCEPT is sent on the data link layer by the MNC device 110 to the relay agent that was selected by the smart electricity meter M+ in question, said smart electricity meter M+ receives only one registration acknowledgement message JOIN-ACCEPT per registration request message JOIN-REQUEST transmitted.

Once the smart electricity meter M+ in question has been registered in the system by the MNC device 110, it is necessary to establish a route (bidirectional, and optionally asymmetric) between the MNC device 110 and the smart electricity meter M+ in question, to communicate without having recourse to successive broadcasts, and without requiring that the relay agent continue fulfilling the role of proxy. A route discovery phase shall be implemented, in order to allow the corresponding updating of the local routing tables of the nodes in the system. To do this, route discovery request messages, referred to as RREQ, and in return route discovery response messages, referred to as RRESP, are broadcast in the system. A transmission mode by successive broadcasts is then used, with a mechanism for preventing perpetual looping that is conventional in routing protocols of the reactive type. This approach is found in particular in the LOADng routing protocol. The route discovery phase may be initiated by the MNC device 110 and/or by the smart electricity meter M+ in question. At the end of the phase of discovery of a route between the MNC device 110 and the smart electricity meter M+ in question, the route having the lowest route cost is established, and the respective local routing tables of the nodes in the system are configured to enable performing communications between the MNC device 110 and the smart electricity meter M+ in question without having recourse to successive broadcasts and without requiring that the relay agent continues to fulfil the role of proxy. When the smart electricity meter M+ relies on a node acting as a relay agent via its radio-frequency communication interface, said node has stored at step 503 the fact that it has been selected as a relay agent by the smart electricity meter M+. Thus, during the phase of discovery of a route between the MNC device 110 and the smart electricity meter M+ in question, said relay agent indicates in its local routing table that the communication with the smart electricity meter M+ is taking place via its radio-frequency communication interface (by default, the local routing table indicates that the communication is taking place via its powerline communication interface). The storage carried out at step 503 therefore enables respecting the choice of communication interface, and therefore indirectly of route, initially made by the smart electricity meter M+ at step 307. In the same way, when a gateway GW is connected directly to the MNC device 110 by its radio-frequency communication interface (like the gateway GW 121' in FIG. 1B), said gateway GW indicates in its local routing table that the communication with the MNC device 110 is taking place via its radio-frequency communication interface.

Once the route is established between the MNC device 110 and the smart electricity meter M+ in question, application messages may be exchanged between the MNC device 110 and the smart electricity meter M+ in question. Such application messages are for example messages in accordance with the DLMS (Device Language Message Specification) and COSEM (Companion Specification For Energy Metering) specifications, to enable in particular the smart electricity meter M+ in question to transmit meter readings to the MNC device 110. From the data link layer point of view, these application messages are simply seen as uplink messages (from the smart electricity meter M+ in question to the MNC device 110) or downlink messages (from the MNC device 110 to the smart electricity meter M+ in question). By way of the local routing tables, the message exchanges take place completely on the data link layer. Only the relay agent has knowledge of the possible presence of the radio-frequency link for attaching the smart electricity meter M+ in question to the system. This aspect is detailed below in relation to FIGS. 6A and 6B.

Figure 6A:
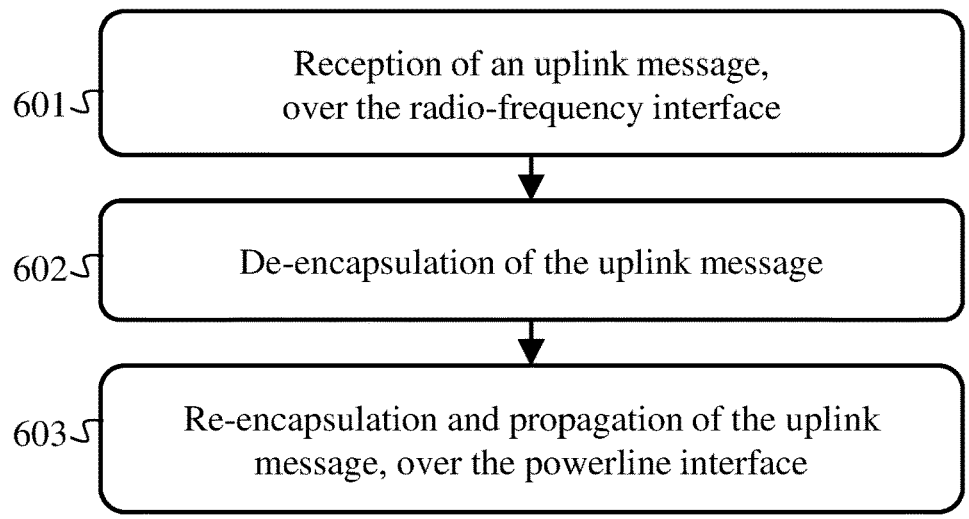
FIG. 6A illustrates schematically an algorithm, executed by said gateway of the system in FIG. 1A, for processing an uplink message after registration of said smart electricity meter.

FIG. 6A illustrates schematically an algorithm, executed by each gateway GW in the system, for processing an uplink message coming from a smart electricity meter M+ for which said gateway GW acts as a relay agent via its radio-frequency communication interface. The algorithm in FIG. 6A is also executed by each smart electricity meter M+, attached to the system via its powerline communication interface, vis-à-vis any other smart electricity meter M+ for which said smart electricity meter M+ acts as a relay agent via its radio-frequency communication interface. Let us consider by way of illustration that the algorithm in FIG. 6A is executed by the gateway GW 121.

The uplink message in question is a message initiated by said smart electricity meter M+ and intended for the MNC device 110. The message is transmitted, through the system, in hops from said smart electricity meter M+ to the MNC device 110. The transmission between said smart electricity meter M+ and the gateway GW 121 is the first hop in the sequence. In order to be able to perform this transmission in hops through the system, the uplink message identifies said smart electricity meter M+ by way of its data link layer address, as well as the MNC device 110, by means also of its data link layer address. In addition, at each hop, the uplink message is updated in order to identify the node in the system from where said uplink message is transmitted, by way of its data link layer address, as well as the node for which said uplink message is destined for the hop in question, by means also of its data link layer address. The hops are thus made while remaining at the data link layer, by way of the local routing tables of the reactive routing protocol, as used in the "mesh-under forwarding" mode of the 6LoWPAN protocol (standing for "IPv6 over Low power Wireless Personal Area Networks", which was initially developed to support IPv6 on IEEE 802.15.4 and which was extended to the G3-PLC standard), which relies on the reactive routing protocol LOADng.

In a step 601, the gateway GW 121 receives, via its radio-frequency communication interface, the uplink message in question, coming from the smart electricity meter M+ in question, for which said gateway GW 121 acts as a relay agent via its radio-frequency communication interface.

In a step 602, the gateway GW 121 de-encapsulates the uplink message in question, so as to keep only the data (header(s) and useful data) independent of the transmission medium. For more details, see FIGS. 8A and 8F described below.

In a step 603, the gateway GW 121 re-encapsulates the uplink message in question in order to enable making, via its powerline communication interface, the next hop to the MNC device 110. The gateway GW 121 identifies the next node en route to the MNC device 110 by way of its local routing table of the reactive routing protocol. The gateway GW 121 updates the uplink message with the data link layer addresses necessary for ensuring the next hop to the MNC device 110. For more details, see FIGS. 8A to 8F described below. The gateway GW 121 then transmits the uplink message, via its powerline communication interface.

In the case where the uplink message generated by said smart electricity meter M+ and intended for the MNC device 110 is received by the gateway GW 121 via its powerline interface, the gateway GW 121 follows the uplink message in question in the powerline communication network by selecting the next node en route to the MNC device 110 in accordance with its local routing table.

However, in the particular configuration of the gateway GW 121' described in relation to FIG. 1B, said gateway GW 121' receives the uplink message in question via its powerline communication interface. The gateway GW 121' then de-encapsulates the uplink message in question, so as to keep only the data (header(s) and useful data) independent of the transmission medium. The gateway GW 121' re-encapsulates the uplink message in question to allow transmission thereof via its radio-frequency communication interface, and transmits said uplink message to the MNC device 110 via its radio-frequency communication interface.

Figure 6B:
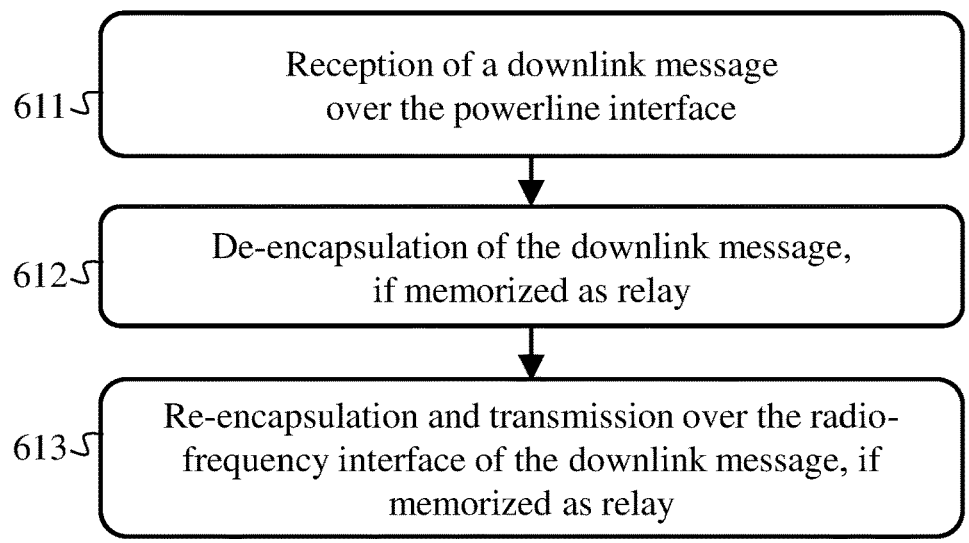
FIG. 6B illustrates schematically an algorithm, executed by said gateway of the system in FIG. 1A, for processing a downlink message after registration of said smart electricity meter.

FIG. 6B illustrates schematically an algorithm, executed by each gateway GW in the system, for processing a downlink message intended for a smart electricity meter M+ for which said gateway GW acts as a relay agent via its radio-frequency communication interface. The algorithm in FIG. 6B is also executed by each smart electricity meter M+, connected attached to the system via its powerline communication interface, vis-à-vis any other smart electricity meter M+ for which said smart electricity meter M+ acts as a relay agent via its radio-frequency communication interface. Let us consider by way of illustration that the algorithm in FIG. 6B is executed by the gateway GW 121.

The downlink message in question is a message initiated by the MNC device 110 and intended for said smart electricity meter M+. The message is transmitted, through the system, in hops from the MNC device 110 to said smart electricity meter M+. The transmission between said smart electricity meter M+ and gateway GW 121 is the last hop in the sequence. The hops are here also made while remaining on the data link layer.

In a step 611, the gateway GW 121 receives, via its powerline communication interface, the downlink message in question, intended for the smart electricity meter M+ in question, for which said gateway GW 121 acts as a relay agent via its radio-frequency communication interface.

In a step 612, the gateway GW 121 de-encapsulates the downlink message in question, so as to keep only the data (header(s) and useful data) independent of the transmission medium. For more details, see FIGS. 8A to 8F described below.

In a step 613, the gateway GW 121 re-encapsulates the downlink message in question to enable making, via its radio-frequency communication interface, the next and last hop to said smart electricity meter M+ for which the gateway GW 121 acts as a relay agent via its radio-frequency communication interface. The gateway GW 121 updates the downlink message with the data link layer addresses necessary for ensuring the next and last hop to the smart electricity meter M+ in question. For more details, see FIGS. 8A to 8F described below. The gateway GW 121 then transmits the downlink message via its radio-frequency communication interface.

In the case where the downlink message generated by the MNC device 110 and intended for said smart electricity meter M+ is received by the gateway GW 121 and the gateway GW 121 does not act for said smart electricity meter M+ as a relay agent via its radio-frequency communication interface, the gateway GW 121 follows the downlink message in question in the powerline communication network by selecting the next node en route to the smart electricity meter M+ (which may be said smart electricity meter M+ itself) in accordance with its local routing table.

However, in the particular configuration of the gateway GW 121' described in relation to FIG. 1B, said gateway GW 121' receives the downlink message in question via its radio-frequency communication interface, directly from the MNC device 110. The gateway GW 121' then de-encapsulates the downlink message in question so as to keep only the data (header(s) and useful data) independent of the transmission medium. The gateway GW 121' re-encapsulates the downlink message in question to enable it to be transmitted via its powerline communication interface to provide the last hop, and transmits said downlink message to the concerned smart electricity meter M+ via its powerline communication interface.

Figure 7:
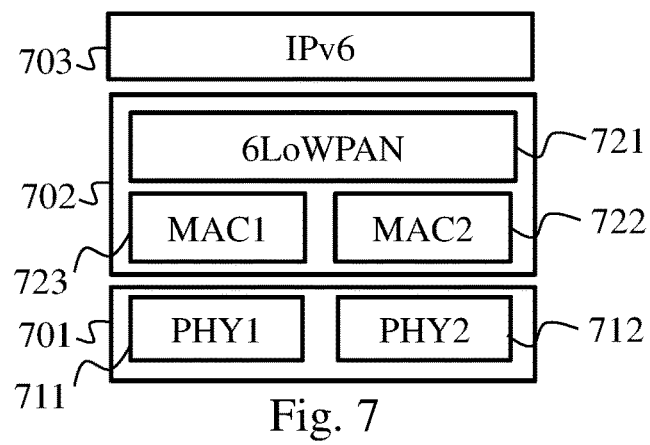
FIG. 7 illustrates schematically a portion of a communication stack used in the system in FIG. 1A and/or FIG. 1B.

FIG. 7 illustrates schematically a portion of a communication stack used in the system.

The communication stack portion depicted schematically in FIG. 7 shows the three lowest layers of the OSI model, namely the physical layer 701, the data link layer 702 and the network layer 703. The communications between network layers of nodes in the system (on which the higher-order layers rely) rely on an IPv6 addressing, whereas the data link layer addresses allow communications between data link layers of nodes in the system (without having to go up to the higher-order layers, including the network layer).

Each gateway GW in the system and each smart electricity meter M+ in the system have at least two communication interfaces, namely a powerline communication interface and at least one radio-frequency communication interface. For each of these interfaces, the physical layer 701 comprises a dedicated physical sublayer. FIG. 7 shows two physical sublayers PHY1 711 (for the powerline communication interface) and PHY2 712 (for a radio-frequency communication interface).

FIG. 7 also shows that the data link layer 702 is broken down into a plurality of sublayers. The data link layer 702 comprises first of all a medium access control MAC sublayer associated with each physical sublayer, and therefore for each communication interface. FIG. 7 also shows a medium access control sublayer MAC1 723 associated with the physical sublayer PHY1 711 and a medium access control sublayer MAC2 722 associated with the physical sublayer PHY2 712. The medium access control sublayers MAC1 723 and MAC2 722 are responsible for providing communications with the neighbours via respectively the physical sublayers PHY1 711 and PHY2 712, and in particular defining the configurations of the physical sublayers PHY1 711 or PHY2 712 to be used for each neighbour (modulation and coding scheme, etc.).

In a particular embodiment, the medium access control sublayers MAC1 723 and MAC2 722 implement similar functionalities and services. More precisely, each of the medium access control sublayers MAC1 723 and MAC2 722 implements the same medium access control mechanism, for example of the CSMA-CA type (carrier sense multiple access with collision avoidance), enabling communicating between adjacent nodes. In addition, each of the medium access control sublayers MAC1 723 and MAC2

722 implements a packet fragmentation and reassembly mechanism, an automatic request repetition mechanism ARQ ("Automatic Repeat reQuest") and a mechanism for continuous listening on the medium when the concerned node is not transmitting over the medium. Preferentially, each of the medium access control sublayers MAC1 723 and MAC2 722 implements a packet priority management mechanism and is capable of supporting packet sizes of 1500 bytes.

The data link layer 702 also comprises an adaptation sublayer 721 interfacing the network layer 701 with the medium access control sublayers MAC1 723 and MAC2 722. The adaptation sublayer 721 implements the local routing table, defining for each node in the system via which neighbour to propagate a message addressed to said node in the system. Each node is identified therein by way of its data link layer address. The reactive routing protocol is thus implemented at this adaptation sublayer 721. The adaptation sublayer 721 is preferentially in accordance with the 6LoW-PAN protocol.

It is therefore apparent in FIG. 7 that the convergence of the radio-frequency and powerline communication interfaces takes place at level 2 of the OSI model (the data link layer). This transmission medium diversity is thus transparent at level 3 of the OSI model (the network layer). This transmission medium diversity is also seen by the adaptation sublayer 721 of each node, which has both a powerline communication interface and at least one radio-frequency communication interface. However, the fact that such and such a node in the system has both a powerline communication interface and at least one radio-frequency communication interface is transparent for the MNC device 110, which may thus manage the system as if all the nodes were directly connected to the powerline communication network.

For reasons of simplification, FIG. 7 does not show the higher-order layers of the OSI model.

FIGS. 8A to 8F illustrate schematically message formats used in the system.

Figure 8A:
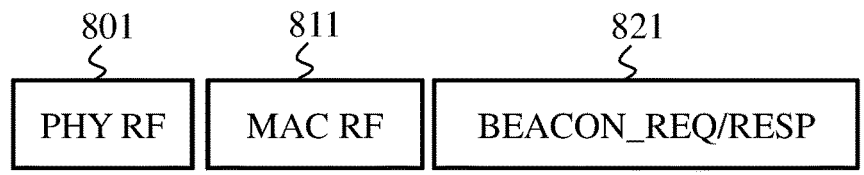
FIGS. 8A to 8F illustrate schematically message formats used in the system in FIG. 1A and/or FIG. 1B.
Figure 8B:
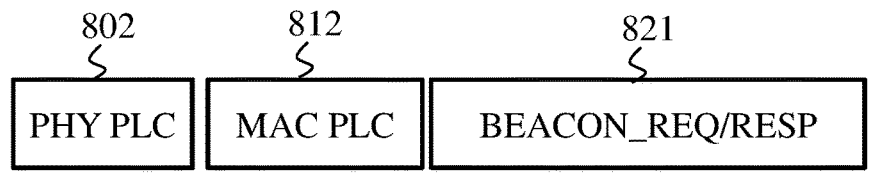

FIG. 8A shows a format of an announcement request message BEACON-REQUEST, or of an announcement message BEACON-RESPONSE, used on the radio-frequency links. The format in FIG. 8A includes a physical layer header PHY RF 801, adapted to the physical sublayer (see FIG. 7) in question. The format in FIG. 8A further includes an access control sublayer header MAC RF 811 (see FIG. 7) adapted to the physical layer in question. The format in FIG. 8A further includes useful data 821 representing the announcement request message BEACON-REQUEST, or the announcement message BEACON-RESPONSE. It should therefore be noted that the format in FIG. 8A does not include an adaptation sublayer header (see FIG. 7) since the announcement request messages BEACON-REQUEST and the announcement messages BEACON-RESPONSE are exchanged only between neighbours and are not routed over the powerline communication network.

FIG. 8A shows a format of an announcement request message BEACON-REQUEST, or of an announcement message BEACON-RESPONSE, used on the powerline links. The format in FIG. 8B includes a physical layer header PHY PLC 802 adapted to the physical sublayer (see FIG. 7) in question. The format in FIG. 8B further includes an access control sublayer header MAC PLC 812 (see FIG. 7) adapted to the physical layer in question. The format in FIG. 8B further includes the useful data 821 already mentioned in relation to FIG. 8A. It should therefore be noted that the format in FIG. 8B does not include an adaptation sublayer header (see FIG. 7) since the announcement request messages BEACON-REQUEST and the announcement messages BEACON-RESPONSE are exchanged only between neighbours and are not routed through the powerline communication network.

Figure 8C:
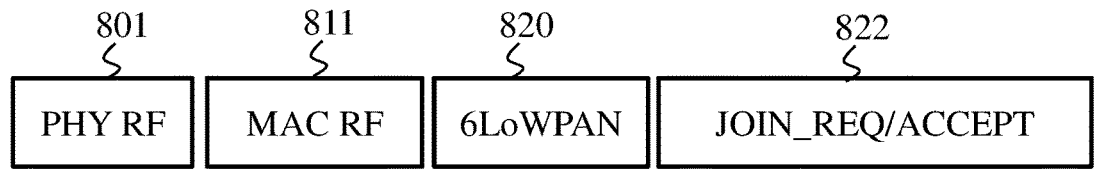

FIG. 8C shows a format of a registration request message JOIN-REQUEST, or of a registration acknowledgement message JOIN-ACCEPT, used on the radio-frequency links. The format in FIG. 8C includes the physical layer header PHY RF 801 already mentioned in relation to FIG. 8A. The format in FIG. 8C further includes the access control sublayer header MAC RF 811 already mentioned in relation to FIG. 8A. The format in FIG. 8C further includes an adaptation sublayer header 820 (see FIG. 7) enabling performing routing through the system. The adaptation sublayer header 820 comprises the data link layer address of the node that is the source of the message (except for the registration request message JOIN-REQUEST) and the address of the data link layer of the node for which the message is intended. The adaptation sublayer header 820 further comprises, for each hop made in the system, the data link layer address of the node that is the source of the message for said hop (except when the registration request message JOIN-REQUEST is sent by the smart electricity meter M+ that seeks to register in the system) and the data link layer address of the node that is the destination of said hop. The adaptation sublayer header 820 is independent of the link, powerline or radio-frequency, over which the message in question is passing. The format in FIG. 8C further includes useful data 822 representing the registration request message JOIN-REQUEST, or the registration acknowledgement message JOIN-ACCEPT. The data link layer address allocated by the MNC device 110 to the smart electricity meter M+ for which said registration acknowledgement message JOIN-ACCEPT is intended is thus included in the adaptation sublayer header 820, as well as the data link layer address of the MNC device 110.

Figure 8D:
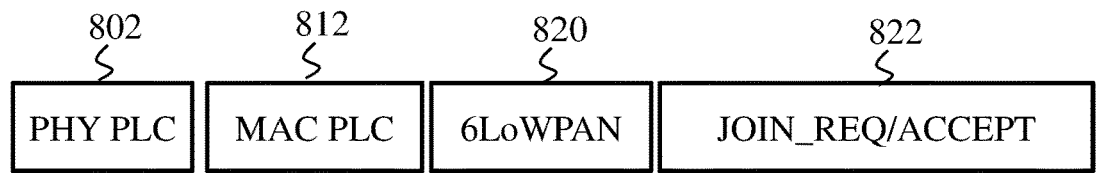

FIG. 8D shows a format of a registration request message JOIN-REQUEST, or of a registration acknowledgement message JOIN-ACCEPT, used on the powerline links. The format in FIG. 8D includes the physical layer header PHY PLC 802 already mentioned in relation to FIG. 8B. The format in FIG. 8D further includes the access control sublayer header MAC PLC 812 already mentioned in relation to FIG. 8B. The format in FIG. 8D further includes the adaptation sublayer header 820 already mentioned in relation to FIG. 8C. The format in FIG. 8D further includes the useful data 822 already mentioned in relation to FIG. 8C.

Figure 8E:
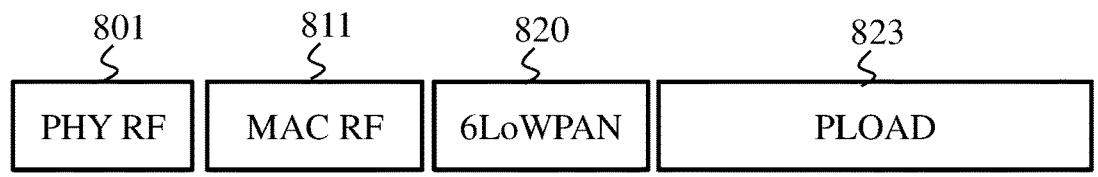

FIG. 8E shows a format of an uplink message, or of a downlink message, used on the radio-frequency links after registration of the smart electricity meter M+ in the system. The format in FIG. 8E includes the physical layer header PHY RF 801 already mentioned in relation to FIG. 8A. The format in FIG. 8E further includes the access control sublayer header MAC RF 811 already mentioned in relation to FIG. 8A. The format in FIG. 8E further includes the adaptation sublayer header 820 already mentioned in relation to FIG. 8C. The adaptation sublayer header 820 comprises the data link layer address of the node that is the source of the message and the data link layer address of the node for which the message is intended. The adaptation sublayer header 820 further comprises, for each hop made in the system, the data link layer address of the source node of the message for which said hop and the data link layer address of the node for which the message is intended for said hop. The adaptation sublayer header 820 is independent of the link, powerline or radio-frequency, used for making said hop. The format in FIG. 8E further includes useful data 823 representing the uplink message, or the downlink message. These useful data 823 may rely on transport protocols and application protocols, for example in accordance with the DLMS and COSEM specifications.

Figure 8F:
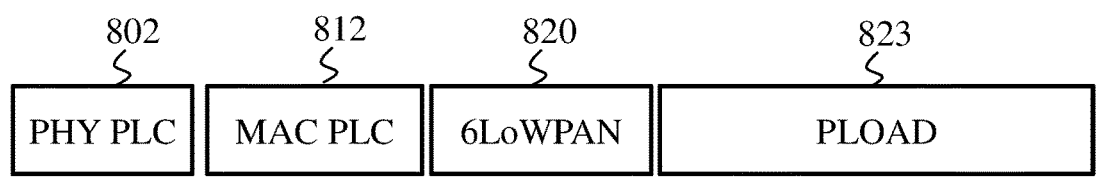

FIG. 8F shows a format of an uplink message or of a downlink message, used on the powerline links after registration of the smart electricity meter M+ in the system. The format in FIG. 8F includes the physical layer header PHY PLC 802 already mentioned in relation to FIG. 8B. The format in FIG. 8F further includes the access control sublayer header MAC PLC 812 already mentioned in relation to FIG. 8B. The format in FIG. 8F further includes the adaptation sublayer header 802 as mentioned in relation to FIG. 8E. The format in FIG. 8F further includes the useful data 823 already mentioned in relation to FIG. 8E.

When a smart electricity meter M+ relies, for communicating with the MNC device 110, on a relay agent via its radio-frequency communication interface, it is possible that the radio-frequency link in question may break, and that the smart electricity meter M+ in question may lose contact with the MNC device 110. Thus, in a particular embodiment, the smart electricity meter M+ monitors the state of the radio-frequency link in question. To do this, the smart electricity meter M+ in question may use one or other or both of the following monitoring mechanisms.

A first monitoring mechanism consists of exchanging, with the relay agent, via said radio-frequency link, radio connectivity check messages. One of the termination points of said radio-frequency link (namely said smart electricity meter M+ or its relay agent) transmits a radio connectivity check request message, called LinkCheckReq. When the other termination point receives this radio connectivity check request message LinkCheckReq, it transmits in response a radio connectivity existence acknowledgement message, called LinkCheckResp. Correctly receiving these messages ensures that radio connectivity is always present.

A second monitoring mechanism consists of periodically exchanging keep-alive messages with the MNC device 110. This further enables the MNC device 110 to know that the smart electricity meter M+ in question is always present in the system. In addition, the exchange with the MNC device 110 of application messages other than said keep-alive messages enables the smart electricity meter M+ in question and the MNC device 110 to know that contact is maintained. The absence of a response to application messages on the other hand reveals a loss of contact.

When the first monitoring mechanism and/or the second monitoring mechanism shows a loss of contact, the smart electricity meter M+ in question reinitiates the algorithm in FIG. 3. The local routing tables are reinitialised, vis-à-vis the route between the smart electricity meter M+ in question and the MNC device 110, at said smart electricity meter M+ and the MNC device 110. The local routing tables of the other nodes in the system are reinitialised, vis-à-vis the route between the smart electricity M+ in question and the MNC device 110, either by lapsing of the data relating to said route (the data are associated with a lifetime), or by definition of a new route by reactivation of a phase of discovery of a route between the smart electricity meter M+ in question and the MNC device 110.

The invention claimed is:

1. A method for connecting a smart electricity meter to a system comprising a powerline communication network with reactive routing protocol to put in contact nodes of the system and a centralised management device of the system with which smart electricity meters that are nodes in the system shall be registered, each path between one said node in the system and the centralised management device consisting of a link or a set of links, each link being associated with a route cost, wherein the system comprises at least one gateway comprising a powerline communication interface for communicating via the powerline communication network and at least one radio-frequency communication interface, and wherein a smart electricity meter seeking to connect to the system and also comprising a powerline communication interface and at least one radio-frequency communication interface performs a registration phase comprising:

broadcasting, on each of its communication interfaces, an announcement request message;

after reception of one or more announcement messages in response to the announcement request message from respectively one or more neighbours in the system, selecting a relay agent, the relay agent being the neighbour in the system having the lowest route cost for joining the centralised management device, each announcement message including information on the cost of the route between the neighbour that sent the announcement message and the centralised management device, wherein neighbours are nodes with which said smart electricity meter can communicate directly without relays via another node in the system; and making a request for registration of said smart electricity meter with the centralised management device, using the selected relay agent as proxy via the communication interface via which the relay agent sent the announcement message that enabled obtaining said lowest route cost, and wherein, the route costs of links relying on powerline communication interfaces and radio-frequency communication links being defined consistently with each other, which means that same route cost scale is used in both cases, and wherein, after registration of said smart electricity meter, the routing of messages coming from or going to said smart electricity meter takes place in the system at the data link layer of the OSI model.

2. The method according to claim 1, wherein, after registration of said smart electricity meter, a route-search procedure by successive broadcasts is implemented between the centralised management device and said smart electricity meter in order to update local routing tables at the data link layer of the OSI model, and, when the communication interface via which the relay agent sent the announcement message that enabled obtaining said lowest route cost is a radio-frequency communication interface, the relay agent enters in its local routing table at the data link layer of the OSI model the fact that the routing of the messages coming from or going to said smart electricity meter takes place via said radio-frequency communication interface.

3. The method according to claim 1, wherein the data link layer of the OSI model of each gateway is broken down into a set of medium access control sublayers specific to said communication interfaces of said gateway and an adaptation sublayer interfacing the network layer of the OSI model with the medium access control sublayers, the routing of messages in the system being performed by said gateway at the adaptation sublayer.

4. The method according to claim 3, wherein each of the medium access control sublayers implements the same medium access control mechanism for communicating between neighbours, a packet fragmentation and reassembly mechanism, an automatic request repetition mechanism and a continuous medium listening mechanism when said gateway is not transmitting on the medium in question.

5. The method according to claim 3, wherein the routing of messages in the system taking place via the adaptation sublayer is in accordance with the 6LoWPAN protocol.

6. The method according to claim 1, wherein, when said smart electricity meter is registered in the system and furthermore the communication interface via which the relay agent sent the announcement message that enabled obtaining the lowest route cost is the powerline communication interface, said smart electricity meter adopts the role of gateway in the system.

7. The method according to claim 1, wherein, when said smart electricity meter is registered in the system and furthermore the communication interface via which the relay agent sent the announcement message that enabled obtaining the lowest route cost is one said radio-frequency communication interface, said smart electricity meter does not respond to any announcement request messages coming from other smart electricity meters.

8. The method according to claim 1, wherein, when furthermore the communication interface via which the relay agent sent the announcement message that enabled obtaining said lowest route cost is one said radio-frequency communication interface, said smart electricity meter establishes with the relay agent a first monitoring mechanism consisting of exchanging, via said radio-frequency communication interface, radio connectivity check messages, and said smart electricity meter reinitiates the registration phase when the first monitoring mechanism shows a loss of radio connectivity.

9. The method according to claim 1, wherein, when furthermore the communication interface via which the relay agent sent the announcement message that enabled obtaining the lowest route cost is one said radio-frequency communication interface, said smart electricity meter establishes with the relay agent a second monitoring mechanism consisting of exchanging with the centralised management device keep-alive messages and/or other application messages, and wherein said smart electricity meter reinitiates the registration phase when the second monitoring mechanism shows a loss of contact with the centralised management device.

10. A non-transitory information storage medium storing a computer program comprising instructions causing execution of the method according to any one of claim 1, when said instructions are executed by a processor.

11. A smart electricity meter intended to be used in a system comprising a powerline communication network with reactive routing protocol for putting in contact nodes in the system and a centralised management device of the system with which smart electricity meters that are nodes in the system shall be registered, each path between one said node in the system and the centralised management device consisting of a link or a set of links, each link being associated with a route cost, wherein the system comprises at least one gateway comprising a powerline communication interface for communicating via the powerline communication network and at least one radio-frequency communication interface, and
    wherein said smart electricity meter, seeking to connect to the system and also comprising a powerline communication interface and at least one radio-frequency communication interface, comprises electronic circuitry configured for performing a registration phase comprising:
        broadcasting an announcement request message on each of its communication interfaces;
        after reception of one or more announcement messages in response to the announcement request message from respectively one or more neighbours in the system, selecting a relay agent, the relay agent being the neighbour in the system having the lowest route cost for joining the centralised management device, each announcement message including information on route cost between the neighbour that sent said announcement message and the centralised management device, wherein neighbours are nodes with which said smart electricity meter can communicate directly without relays via another node in the system; and
        making a request for registration of said smart electricity meter with the centralised management device, using the selected relay agent as a proxy via the communication interface via which the relay agent sent the announcement message that enabled obtaining said lowest route cost;
    wherein, the route costs of links relying on powerline communication interfaces and radio-frequency communication links being defined so as to be consistent with each other, which means that same route cost scale is used in both cases, and
    wherein, after registration of said smart electricity meter, the routing of messages coming from or going to said smart electricity meter takes place at the data link layer of the OSI model.

12. A method implemented by a gateway in a system further comprising a powerline communication network with reactive routing protocol for putting in contact nodes of the system and a centralised management device of the system with which smart electricity meters that are nodes in the system shall be registered, each path between one said node in the system and the centralised management device consisting of a link or a set of links, each link being associated with a route cost,
    wherein said gateway comprises a powerline communication interface for communicating via the powerline communication network and at least one radio-frequency communication interface, and
    wherein, when a smart electricity meter seeking to connect to the system and also comprising a powerline communication interface and at least one radio-frequency communication interface performs a registration phase, said gateway, in a first configuration, performs:
        receiving an announcement request message;
        transmitting, in response to the announcement request message and on each communication interface via which said announcement request message was received, an announcement message including information on route cost between said gateway and the centralised management device; and,
        on request for registration of said smart electricity meter with the centralised management device, adopting a proxy role vis-à-vis said smart electricity meter for propagating said registration request in the powerline communication network;
    wherein, the route costs of links relying on powerline communication interfaces and radio-frequency communication links being defined so as to be consistent with each other, which means that same route cost scale is used in both cases, and wherein, after registration of said smart electricity meter, the gateway is configured so that the routing of messages coming from or going to said smart electricity meter takes place at the data link layer of the OSI model.

13. The method according to claim 12, wherein, in a second configuration, said gateway is connected directly to the centralised management device via its radio-frequency communication interface, said gateway ignores any announcement request message received coming from one said smart electricity meter via its radio-frequency communication interface, said gateway ignores any registration request, received via its powerline communication interface, for a smart electricity meter that is not adjacent to said gateway, and wherein said gateway otherwise acts in the second configuration as in the first configuration.

14. The method according to claim 13, wherein said gateway is connected directly to the centralised management device by way of a link relying on a cellular telecommunication network.

15. A gateway intended to be used in a system comprising a powerline communication network with reactive routing protocol for putting in contact nodes in the system and a centralised management device of the system with which smart electricity meters that are nodes in the system shall be registered, each path between one said node in the system and the centralised management device consisting of a link or a set of links, each link being associated with a route cost, wherein said gateway comprises a powerline communication interface for communicating via the powerline communication network and at least one radio-frequency communication interface, and wherein, when a smart electricity meter seeking to connect to the system and also comprising a powerline communication interface and at least one radio-frequency communication interface performs a registration phase, said gateway comprises electronic circuitry configured for:

receiving an announcement request message;

transmitting, in response to the announcement request message and on each communication interface via which said announcement request message was received, an announcement message including information on route cost between said gateway and the centralised management device; and on a request for registration of said smart electricity meter with the centralised management device, adopting a proxy role vis-à-vis said smart electricity meter for propagating said registration request in the powerline communication network;

wherein the route costs of links relying on powerline communication interfaces and radio-frequency communication links being defined so as to be consistent with each other, which means that same route cost scale is used in both cases, and wherein, after registration of said smart electricity meter, the gateway is configured so that the routing of messages coming from or going to said smart electricity meter takes place at the data link layer of the OSI model.

16. A non-transitory information storage medium storing a computer program comprising instructions causing execution of the method according to a claim 12 when said instructions are executed by a processor.

* * * * *